United States Patent
O'Connell et al.

(10) Patent No.: US 12,301,581 B2
(45) Date of Patent: *May 13, 2025

(54) SYSTEMS AND METHODS FOR ENHANCED AUTHORIZATION MESSAGES

(71) Applicant: Visa International Service Association, San Francisco, CA (US)

(72) Inventors: Craig O'Connell, San Mateo, CA (US); Karl Newland, Pacifica, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/438,881

(22) Filed: Feb. 12, 2024

(65) Prior Publication Data
US 2024/0187416 A1 Jun. 6, 2024

Related U.S. Application Data

(63) Continuation of application No. 17/284,754, filed as application No. PCT/US2018/056206 on Oct. 17, 2018, now Pat. No. 11,936,657.

(51) Int. Cl.
*H04L 9/40* (2022.01)
*G06F 21/31* (2013.01)

(52) U.S. Cl.
CPC ............ *H04L 63/102* (2013.01); *G06F 21/31* (2013.01)

(58) Field of Classification Search
CPC . H04L 63/102; H04L 9/321; H04L 2463/102; H04L 63/14; G06F 21/31; G06F 21/577; G06Q 20/401; G06Q 20/4016
See application file for complete search history.

(56) References Cited

U.S. PATENT DOCUMENTS

| 9,367,844 | B1 | 6/2016 | Hu et al. |
| 2011/0258118 | A1* | 10/2011 | Ciurea ............. G06Q 20/40 705/44 |

(Continued)

FOREIGN PATENT DOCUMENTS

CN 106575400 A 4/2017

OTHER PUBLICATIONS

Application No. EP18937016.6, Extended European Search Report, Mailed On Sep. 13, 2021, 6 pages.

(Continued)

*Primary Examiner* — Abiy Getachew
(74) *Attorney, Agent, or Firm* — Kilpatrick Townsend & Stockton LLP

(57) ABSTRACT

Techniques for authorizing a transaction or interaction of a user that is modified by authentication information for the same user are described herein. In embodiments, an authorization request message for a transaction and a session identifier may be received from a transport computer or a resource provider computer. A portion of pre-analyzed data about the user and the one or more interactions may be obtained, from a database, based on the session identifier. A risk analysis for the transaction using the portion of the pre-analyzed data may be performed to generate a value. The authorization request message may be modified to include the portion of the pre-analyzed data and the value. The modified authorization request message may be transmitted to an authorizing computer.

17 Claims, 5 Drawing Sheets

(56) References Cited

U.S. PATENT DOCUMENTS

| | | | |
|---|---|---|---|
| 2014/0310176 A1* | 10/2014 | Saunders | G06Q 20/405 |
| | | | 705/44 |
| 2014/0344155 A1 | 11/2014 | Liu et al. | |
| 2015/0317633 A1 | 11/2015 | Saunders et al. | |
| 2015/0356562 A1 | 12/2015 | Siddens et al. | |
| 2016/0260100 A1 | 9/2016 | Wiesman | |
| 2017/0243221 A1* | 8/2017 | Gill | G06Q 20/4016 |
| 2018/0137504 A1* | 5/2018 | Goldenberg | G06Q 20/4016 |

OTHER PUBLICATIONS

Application No. PCT/US2018/056206, International Search Report and Written Opinion, Mailed On Jul. 15, 2019, 12 pages.

Application No. SG11202103705X, Written Opinion, Mailed On Dec. 21, 2022, 9 pages.

Application No. CN201880098778.7, Office Action, Mailed On Nov. 1, 2024, 26 pages with translation.

Application No. CN201880098778.7, Office Action, Mailed On Mar. 15, 2025, 9 pages with translation.

\* cited by examiner

SYSTEMS AND METHODS FOR ENHANCED AUTHORIZATION MESSAGES

CROSS-REFERENCE TO RELATED APPLICATIONS

This application is a continuation of U.S. patent application Ser. No. 17/284,754, filed Apr. 12, 2021, which is a 371 National Stage of International Patent Application No. PCT/US2018/056206 filed Oct. 17, 2018, the disclosures of which are incorporated by reference herein in their entireties.

BACKGROUND

As users increasingly interact with resource providers using portable computing devices (e.g., desktop computers, laptop computers, tablet computers, mobile phones, gaming devices, etc.) over networks, including the internet, the risks to the resource providers have increased that an interaction may be a fraudulent interaction. It may be difficult for resource providers to discern which interactions legitimate users are conducting and which interactions individuals attempting to conduct fraudulent activity are conducting. Data may be gathered or aggregated from multiple sources, such as authentication services, to determine a single risk assessment based on a totality of data accessible for a user and their interactions with a resource provider or other resource. However, using this data has several drawbacks. For example, sometimes unnecessary financial, system, and network resources may be required to gather and aggregate available data for a user and their interactions.

However, authentication services may only utilize certain data points from the large gathered data to identify a risk assessment thus unnecessarily utilizing resources to obtain and store data that is not helpful to the risk assessment process. Moreover, static data points or models may be used by authentication services such that they are unable to adapt to new fraud activity trends or new user data that is made available via their interactions with a resource provider thus providing in accurate risk assessment scores. During a transaction or interaction with a resource provider an authorization of the interaction may be performed which may utilize the risk analysis performed by an authentication service. However, implementing or properly utilizing the risk analysis in an authorization service may lead to utilizing even more financial, system and network resources thereby slowing down the authorization process to the point that users interactions are impacted and resource providers lose transactions. Thus, new and enhanced methods of modifying authorization processes are needed which more efficiently utilize authentication data while providing a dynamic and reliable authorization service for interactions with resource providers.

SUMMARY

Systems and techniques for authorizing a transaction or interaction of a user that is modified by authentication information for the same user are described herein. Data from external entities such as authentication services may be analyzed via risk assessment models and the data points obtained from users interacting with resource providers and/or authentication services along with derived authentication risk assessment values or scores may be stored in a database (supplemental database). In embodiments, when a user interacts or otherwise conducts transactions with resource providers or utilizes authentication services, a session identifier may be generated and associated with the data and an authentication risk assessment value in the database. In accordance with at least one embodiment, a resource provider or other entity such as a transport computer on behalf of the resource provider may invoke the modified authorization feature described herein by providing transaction information as well as a session identifier, which matches a session identifier stored in the database, in an authorization request message. A processor computer may receive the authorization request message and obtain a portion of the data stored in the database using the session identifier to perform a risk analysis for the authorization request message using the portion of the data. In accordance with at least one embodiment, the authorization request message may be modified to represent the portion of the data obtained from the data store as well as a risk analysis score performed using the portion of the data. The processor computer may transmit the modified authorization request message and the portion of the data to an authorizing computer which may authorize or deny the transaction by generating an authorization response message.

One embodiment of the disclosure is directed to a computer-implemented method performed by a processing computer including receiving, from a transport computer or a resource provider computer, an authorization request message for a transaction and a session identifier, where the session identifier is generated by the resource provider computer and associated with data for one or more interactions by a user associated with the transaction and stored in a supplemental database, obtaining, by the processing computer and from the supplemental database, a portion of pre-analyzed data about the user and the one or more interactions based at least in part on the session identifier, performing, by the processing computer, a risk analysis for the transaction using the portion of the pre-analyzed data to generate a value, where the value represents a likelihood of a fraudulent transaction for the transaction, modifying, by the processing computer, the authorization request message to include the portion of the pre-analyzed data and the value, transmitting, by the processing computer and to an authorizing computer, the modified authorization request message, and transmitting, to the transport computer, an authorization response message from the authorizing computer, where the authorizing computer generates the authorization response message based on the modified authorization request message, the authorization response message approving or declining the transaction.

In some embodiments, the computer-implemented method may further include transmitting, to the transport computer, the portion of pre-analyzed data and the value. In embodiments, the portion of the pre-analyzed data is selected from the supplemental database based at least in part on preferences specified by the authorizing computer. In embodiments, modifying the authorization request message to include the portion of pre-analyzed data and the value includes modifying a data field in the authorization request message. In embodiments, the computer-implemented method may further include updating the supplemental database with updated interactions by the user by utilizing an application programming interface (API) call by the resource provider to the supplemental database. In embodiments, the session identifier may include at least a key or a unique user identifier. In embodiments, generating the authorization response message by the authorizing computer includes the authorizing computer not performing an analysis of the transaction based at least in part on the modified authorization request message.

Another embodiment of the disclosure is directed to a server including a processor, and a computer readable medium coupled to the processor, the computer readable medium including code, executable by the processor, to implement a method including receiving, from a transport computer or a resource provider computer, an authorization request message for a transaction and a session identifier, where the session identifier is generated by an authentication requestor and associated with data for one or more interactions by a user associated with the transaction and stored in a database, obtaining, from the database, a portion of pre-analyzed data about the user and the one or more interactions based at least in part on the session identifier, performing a risk analysis for the transaction using the portion of the pre-analyzed data to generate a value, where the value represents a likelihood of a fraudulent transaction for the transaction, modifying the authorization request message to include the portion of the pre-analyzed data and the value, and transmitting, to an authorizing computer, the modified authorization request message.

In some embodiments, the method implemented by the server further includes transmitting, to the transport computer, an authorization response message from the authorizing computer, where the authorizing computer generates the authorization response message based on the modified authorization request message, the authorization response message approving or declining the transaction. In some embodiments, the pre-analyzed data is analyzed by one or more authentication risk models associated with a plurality of authentication requestors. In embodiments, the pre-analyzed data includes one or more of a device identifier associated with the transaction, transaction detail information, personal information for the user, internet protocol (IP) address information, web site traffic, or web site interaction information. In embodiments, modifying the authorization request message includes setting one or more flags associated with an authorization request message for the transaction. In embodiments, the method implemented by the server further includes transmitting, to the transport computer, the portion of the pre-analyzed data and the value. In embodiments, the portion of the pre-analyzed data is selected from the supplemental database based at least in part on preferences specified by the authorizing computer.

Another embodiment of the disclosure is directed to an authorizing computer including a processor, and a computer readable medium coupled to the processor, the computer readable medium including code, executable by the processor, to implement a method including receiving, by the processor computer and from a transport computer or a resource provider computer, an authorization request message for a transaction and a session identifier, the session identifier generated by an authentication requestor and associated with data for one or more interactions by a user associated with the transaction and stored in a database, obtaining, by the processor computer and from the database, a portion of pre-analyzed data about the user and the one or more interactions based at least in part on the session identifier, performing, by the processor computer, a risk analysis for the transaction using the portion of the pre-analyzed data to generate a value, the value representing a likelihood of a fraudulent transaction for the transaction, modifying, by the processor computer, the authorization request message to include the portion of the pre-analyzed data and the value, and transmitting, by the processor computer and to an authorizing computer, the modified authorization request message.

DETAILED DESCRIPTION

Figure 1:
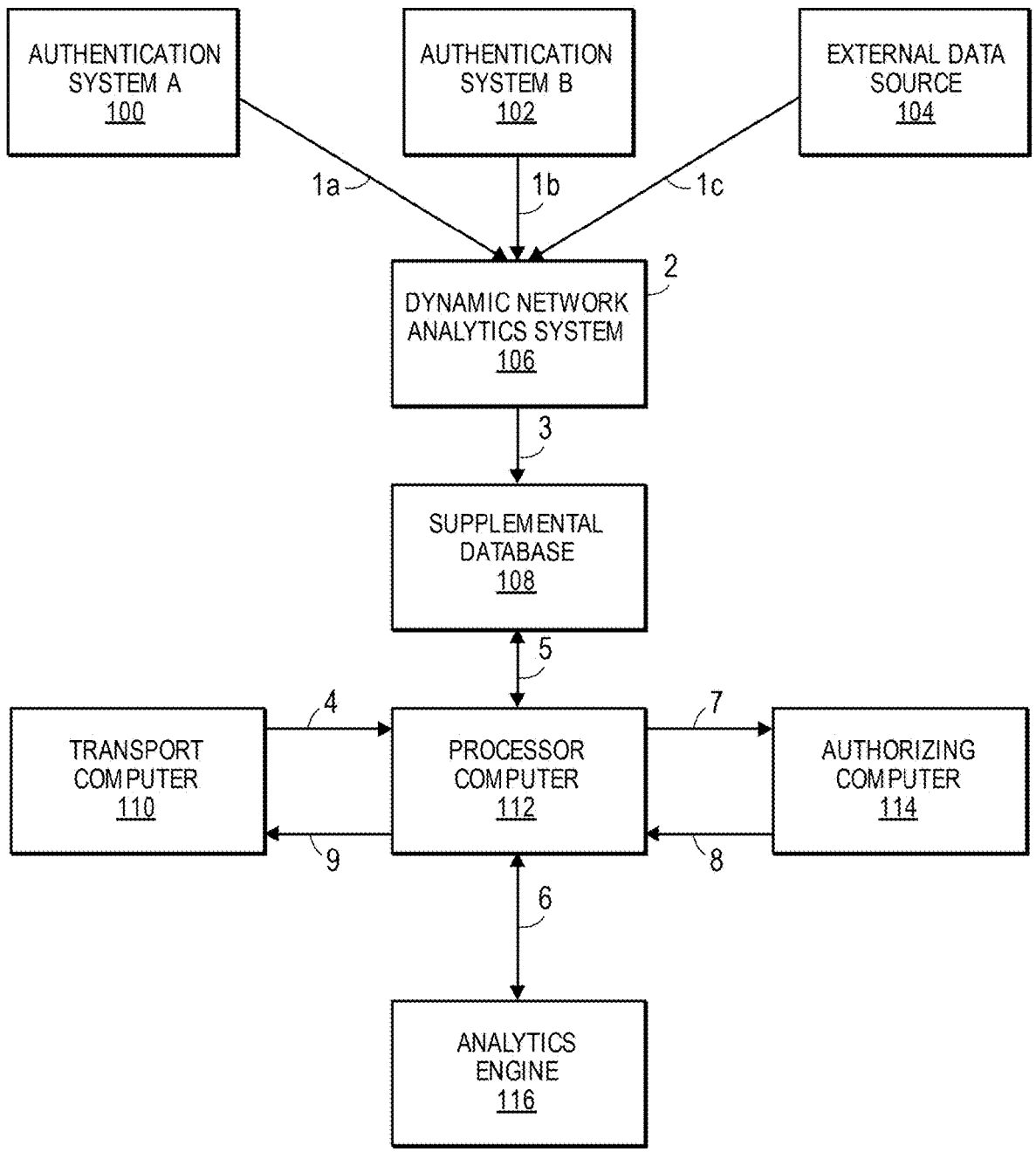
FIG. 1 depicts a number of components that may be involved in a system used to implement at least some embodiments of the disclosure.

Prior to discussing embodiments of the invention, some terms can be described in further detail.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may include one or more computational apparatuses and may use any of a variety of computing structures, arrangements, and compilations for servicing the requests from one or more client computers.

A "memory" may be any suitable device or devices that may store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

A "processor" may refer to any suitable data computation device or devices. A processor may include one or more microprocessors working together to accomplish a desired function. The processor may include a CPU that includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

An "acquiring entity" can be an entity that can come into possession of something. An acquiring entity may be a business entity (e.g., a commercial bank) that has a business relationship with a particular resource provider, merchant, or other entity. An acquiring entity may operate an acquiring entity computer, which may be referred to as a "transport computer."

A "remote server computer" may include to a computer that is remotely located with respect to a client computer. In some embodiments, a remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity.

An "authorization request message" may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also include additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also include "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "supplemental database" may be a database that stores supplemental information. In some embodiments, a supplemental database may be a database that is accessed by a processor computer in response to receiving an authorization request message and a session identifier. In some cases, a processor computer may not access the supplemental database to obtain data utilized to analyze an authorization request message if a session identifier is not associated with or provided with the authorization request message. In embodiments, the supplemental database may store a number of data points, metrics, or attributes for use in authentication analysis by a dynamic network analytics system or for modifying an authorization request message as described herein. The supplemental database may store transaction information, device information, internet protocol (IP) information for a device associated with a transaction (device data), personal information for a user associated with a transaction (consumer data), interaction data or interactions, web site traffic, or web site interaction information such as membership in a particular program offered by a resource provider. In embodiments, the supplemental database may store information that identifies particular analysis models, data, and which party, if any, performed external risk analysis during an authentication process.

The term "data analyzer module" may include a software component that can analyze data. In some embodiments, the data analyzer module may include a software component for a risk evaluation system within the dynamic network analytics system. In embodiments, the data analyzer module electronically receives data messages from data requesters (authentication requests), and attempts to answer queries contained in the data messages. In embodiments, the data analyzer module and/or the dynamic network analytics system is configured to make risk assessments regarding interactions and transactions by evaluating past transaction data and past interaction data for users. In order to answer the query contained in the data messages, the data analyzer module may access risk analysis algorithms or dynamic risk tables, as well as query one or more of a plurality of external data sources.

The term "data message" may include a message that includes data. In some embodiments, a data message may include a message sent as part of a process of determining risk of an interaction with a resource provider. In embodiments, the data message may include device data, consumer data, interaction data, and transaction data as part of the query sent from a data requestor to the dynamic network analytics system. The data message may also be an authentication message or an authentication request message in some embodiments.

The term "external data sources" may include external sources that can provide data. In embodiments, an external data source may be located physically external from the system (e.g., in a separate physical location or separate computer), or may be located in a distinct location within a physical memory component within the system. In embodiments, an external data source may refer to a source within the system that requires additional authentication processes or credentials to access. An external data source may be a source outside of a system firewall or located outside of a network of a company, system, or entity. In embodiments, an external data source may include third party vendors that gather, analyze, and provide risk assessment data.

The term "device data" may include data pertaining to a device. In some embodiments, device data may include data that may be used to conduct a risk evaluation. Device data may refer to data regarding a portable computing device, such as a computer or mobile phone. Examples of device data may include unique identifiers for a computer or mobile phone, an internet protocol (IP) address, SIM card data, and device make and model data. Device data may also include the device's MSISDN, or Mobile Subscriber Integrated Services Digital Network-Number, which is a number that uniquely identifies a subscription in a mobile network.

The term "consumer data" or "user data" may include data pertaining to a user. In some embodiments, consumer data or user data may include data that may be used to conduct a risk evaluation. Consumer data may include the name, mailing address, shipping address, phone number, payment account number, date of birth, marital status, income, social security number, demographic data, etc. In embodiments, consumer data may also include consumer preferences, notification methods, and prior transaction history. In embodiments, consumer data may be stored in the supplemental database and used as part of the risk analysis.

The term "interaction" may include an action conducted by a user or consumer. In embodiments, the user or consumer conducts interactions with a resource provider, such as a merchant website. Typical interactions with a merchant system may include, but are not limited to, connecting to the merchant website, presenting authentication data to log into an account with the merchant website, modifying account settings on the merchant website, requesting authentication data, viewing products on the merchant website, and conducting a financial transaction. The interactions are typically conducted using a computing device (e.g., a desktop computer, laptop computer, tablet computer, internet-capable mobile phone, etc.) that is capable of connecting to the resource provider.

The term "interaction data" may refer to data that may be used to conduct a risk evaluation. Interaction data may include data based on the type of interaction being conducted by the user. Interaction data may also include a length of interaction, time of data of interaction, etc. The interaction data may be used as part of the risk evaluation as different interactions may have different levels of risk associated with them. For example, the risk of a user connecting with a merchant website may be considered to be an interaction involving lower risk than the user attempting to complete a financial transaction. In embodiments, the interaction data may be used to establish an initial risk assessment prior to the dynamic network analytics system retrieving and analyzing stored and retrieved data. In embodiments, the interaction data may be stored in the supplemental database. The stored interaction data may be used as part of the risk analysis to determine past interaction history associated with a user or device.

The term "transaction data" may include data that is associated with a transaction. In some embodiments, transaction data may include data that may be used to conduct a risk evaluation. Transaction data may include data for a specific transaction, including items purchased, item prices, total cost, shipping address, payment methods, authentication data, merchant data, etc. In embodiments, transaction data may only be generated once the user or consumer attempts to submit a transaction for processing. In embodiments, transaction data may be generated and provided to the risk analysis system by the resource provider based on items added to a user's shopping cart. In embodiments, the transaction data may be stored in the supplemental database and be used as part of the risk analysis to determine past transaction history associated with a user or device.

The term "interaction history" may refer to a history of previous interactions (one or more interactions). In some embodiments, the previous interactions conducted by a user are stored in the supplemental database and accessed by the dynamic network analytics system and the processor computer. The interaction history of a specific user or consumer can be used as part of a risk analysis for a current interaction by the specific user or consumer. In embodiments, the interaction history of similar consumers can be used as part of a risk analysis for a current interaction. For example, a user may have previously logged onto a merchant's website to modify a shipping address associated with a particular user account. Viewed as a single interaction between the user and a resource provider system, a modification to the shipping address may have a low level of risk associated with it. However, by retrieving and analyzing the interaction history for the user, a changed shipping address in the first interaction, followed by a second interaction later in time for the purchase of an expensive item may be indicated of fraudulent activity and/or may increase the risk level associated with the interaction.

The term "consumer" may refer to an individual or entity. The consumer may be associated with a financial account and with a user account with a resource provider. The consumer's financial account can be used to conduct financial transactions with the resource provider. In embodiments, the consumer conducts non-transaction related interactions with the resource provider. The consumer may be an individual attempting to conduct fraudulent activity by interacting with a resource provider using fraudulent or stolen authentication data. The term "use" may be used interchangeably with "consumer."

The term "session identifier" may include an identifier associated with an interaction session. In some embodiments, a session identifier may include a unique identifier for one or more interactions of a user with an authentication entity and/or resource provider. In embodiments, a session identifier may be associated with a set of data or attributes such as interactions, transaction data, consumer data, etc., and stored in the supplemental database with such data. In embodiments, a session identifier may include a unique key or a unique user identifier (UUID). In embodiments, the session identifier may be transmitted by an authentication system to a resource provider and/or a transport computer prior to generation of the authorization request message for a transaction. In some embodiments, the resource provider and/or transport computer generates the session identifier in response to interacting with the dynamic network analytics system.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

An "access control server" may include a server computer that provides authentication services to authenticate a user conducting an online transaction. An access control server may perform the requested authentication services for issuers or other entities, and provide digitally signed responses to entities requesting authentication. An access control server may be shared or used by multiple entities. An entity may also have multiple access control servers, each associated with a different subset of the users. In some embodiments, an access control server is operated by an issuer.

A "directory server" may include a server computer that can be used to route messages in a transaction system. In some embodiments, the messages routed by the directory server may contain enrollment and authentication information between a merchant plug-in (MPI) and an issuer access control server. The directory server can also determine whether an account can utilize the authentication services. In some embodiments, the directory server can be operated by a transaction service provider. According to various embodiments, the directory server may also have the ability to tokenize account data or may de-tokenize tokens.

Embodiments of the invention provide for methods and systems that enhance conventional authorization processes by a processor computer and authorizing computer in an authorization message request and response system on behalf of a resource provider and/or transport computer. Embodiments of the invention enable a processor computer to enhance and provide more reliable and up-to-date authorization analysis features for transactions associated with a resource provider or transport computer. In accordance with at least one embodiment, a session identifier may be generated and associated with a collection of data or attributes such as interactions by a user with a resource provider during an authentication risk analysis procedure performed by a dynamic network analytics system. The data utilized in performing the authentication risk analysis procedure and the session identifier associated with the data and the outcome of the risk analysis procedure may be stored in a supplemental database. Subsequently, a resource provider associated with the authentication risk analysis procedure or a transport computer associated with the authentication risk analysis procedure may generate an authorization request message for a transaction by the user and include the session identifier. A processor computer may receive the authorization request message and obtain the data, or a portion thereof, from the supplemental database that is associated with the user based on the received session identifier. The processor computer may perform an enhanced authorization process analysis and/or modify the authorization request message to include the session identifier and data from the supplemental database. The modified authorization request message may be transmitted to an authorizing computer for enhanced analysis using the transaction information included in the authorization request message as well as the additional data obtained from the supplemental database. The authorization computer may determine whether to approve or decline the transaction using the data from the supplemental data and one or more authorization models.

Embodiments of the invention provide advantages over conventional authorization processing techniques. For example, previous authorization processes may have had to make several data requests from one or more parties to obtain the appropriate amount and type of data to perform an enhanced authorization process. This conventional message request and response structure would add seconds to each transaction request without taking into account that a particular source may be unavailable to provide data. When dealing with hundreds of thousands of transactions per minute each added moment could delay the authorization process and thus degrade the user experience. Additional improvements can be achieved in the current disclosure by requesting only a portion of the data associated with a user from the supplemental database using the session identifier and preferences specified by an authorizing computer. For example, instead of providing a large amount of data that may mostly be useless to certain authorizing entities, each authorizing entity in a transaction process can specify which portions of data are most useful and thereby requested from the supplemental database via the processor computer. Again, time savings can be achieved as the authorizing computer can more efficiently authorize or decline a transaction using a smaller subset of data than all available data stored in the supplemental database according to their own preferences. For example, a certain authorizing entity may heavily rely on an authentication score generated by an authentication system for a user prior to transaction completion to authorize the transaction thereby relying on fewer attributes or data in the transaction process to complete authorization of the transaction. Other authorizing entities may perform their own authorization techniques including using authorization models and find certain subsets of data associated with a user are required to authorize or decline a transaction than other subsets of data.

FIG. 1 depicts a number of components that may be involved in a system used to implement at least some embodiments of the disclosure. In FIG. 1, one or more authentication system, such as authentication system A 100 and authentication system B 102 may provide authentication requests for one or more users engaging in transactions or interacting with authentication systems and/or resource providers (e.g., resource provider websites). For example, authentication system A 100 may be configured to receive and process a plurality of authentication requests on behalf of resource providers engaging in interactions or transactions with a user or consumer (not pictured). In accordance with at least one embodiment, the authentication systems (100 and 102) may request interact or otherwise communicate with dynamic network analytics system 106 to request or generate a session identifier that is associated with the data used by the authentication systems 100 and 102 in generating the risk analysis value or score (e.g., transaction information, personal information, device information). The dynamic network analytics system 106 may be configured to associate the session identifier with the received data and the calculated score and store the session identifier, received data, and the calculated score in the supplemental database 108 (which may collectively be referred to as pre-analyzed data). In embodiments, authentication systems 100 and 102 may generate the session identifier by utilizing a particular application programming interface (API) when either requesting risk analysis to be performed by the dynamic network analytics system 106 or providing data and a result of a risk analysis to the dynamic network analytics system 106.

FIG. 1 includes external data source 104 performing risk analysis procedures or operations and providing calculated risk analysis scores or values to dynamic network analytics system 106. In embodiments, external data source 104 transmits any data utilized in the risk analysis such as transaction information, personal information, device information, the calculated score or value of the risk analysis, and a generated session identifier, which is associated with the data and the score, to the dynamic network analytics system 106. The dynamic network analytics system 106 is configured to store the received data from authentication system A 100, authentication system B 102, and external data source 104 in the supplemental database 108 and associate any generated session identifiers with the appropriate data sets and risk analysis scores. In embodiments, generated session identifiers are unique per transaction, per user device, or per user. In accordance with at least one embodiment, a user or user device may be associated with one or more unique session identifiers, where a first unique session identifier is generated for a transaction or interaction by a user with a resource provider or other entity and, a second unique session identifier that is used to aggregate all session identifiers for a user or user device for aggregate data analysis.

FIG. 1 depicts a transport computer 110 which may receive and/or generate an authorization request for a transaction being processed by an associated resource provider (not pictured). The transport computer may communicate with one or more other components for implementing the enhanced authorization features described herein including a processor computer 112, and an authorizing computer 114. In embodiments, the transport computer 110 may provide an authorization request message and a received or obtained session identifier to the processor computer 112. The processor computer 112 may be configured to identify the inclusion of a session identifier and request or obtain a portion of the data associated with the session identifier from the supplemental database 108. In accordance with at least one embodiment, the processor computer 112 may transmit the portion of the data retrieved using the session identifier from the transport computer 110 to the analytics engine 116 for authorization risk analysis. The analytics engine 116 may be configured to utilize the received data, including the current transaction data from transport computer 110 in the authorization request message, to generate a value corresponding to a likelihood that the current transaction is a fraudulent transaction. For example, the analytics engine 116 may utilize one or more authorization risk analysis models to identify whether the current transaction is a fraudulent transaction and generate a value which represents the likelihood that the current transaction is a fraudulent transaction.

The processor computer 112 may be configured to transmit the value generated by the analytics engine 116 and the retrieved data from the supplemental database 108 to the authorizing computer 114. In embodiments, the retrieved data from the supplemental database 108 may include a result of the authentication risk analysis performed by the dynamic network analytics system 106 and associated with a session identifier. In accordance with at least one embodiment, the authorizing computer 114 may use the retrieved data from the supplemental database 108 and the generated value to determine whether to authorize or decline the transaction. In accordance with at least one embodiment, the authorizing computer 114 may receive the retrieved data from the supplemental database 108, using the session identifier, to determine whether to authorize or decline the transaction without further analysis or value generation by the analytics engine 116. It should be understood that for simplicity of illustration, a certain number of components are shown in FIG. 1. However, some embodiments may include more than one of each component, and some embodiments may include fewer than or greater than components specifically shown in FIG. 1.

For illustrative purposes, FIG. 1 also includes one or more operations that may be implemented by the components of FIG. 1 that are included in the enhanced authorization features described herein. In FIG. 1 at operations 1a, 1b, and 1c, authentication system A 100, authentication system B 102, and external data source 104 may generate and transmit session identifiers and data for one or more transactions or interactions by users with resource providers or other entities to dynamic network analytics system 106. For example, authentication system A 100 may be requested by a resource provider computer (e.g., a merchant computer) in a transaction to analyze a user's computer system to determine if it might be on a blacklist or otherwise not associated with a legitimate user. The authentication system B 101 may be requested by the resource provider computer in the same transaction to assess the risk that the current user conducting the transaction is not the legitimate user. This may be done by checking external data sources that might be able to verify that the account being used is legitimate (e.g., by checking it against a blacklist). Further, the external data source 104 may be requested by the resource provider computer in the same transaction to provide data that might be useful in assessing the likelihood of fraud in the current transaction (e.g., past fraud scores associated with the account being used). In each instances, the resource provider computer or a transport computer associated with the resource provider computer may provide the session identifier, each of the authentication system A 100, authentication system B 102, and external data source 104 may provide the requested data and the session identifiers to the dynamic network analytics system 106. In some embodiments, the external data source 104 may provide a generated authentication risk analysis score and a session identifier to the dynamic network analytics system 106.

At operation 2, the dynamic network analytics system 106 may invoke one or more authentication models for generating an authentication risk value on behalf of the authentication systems 100 and 102. In embodiments, the dynamic network analytics system 106 may use the data received from the authentication systems 100 and 102 as well as data received from external data source 104 (e.g., personal information, transaction information, device information, etc.) to invoke the authentication models and generate an authentication risk value.

At operation 3 of FIG. 1 the dynamic network analytics system 106 may store the authentication risk value, the data utilized to generate the authentication risk value, and the session identifier which is associated with the authentication risk value and the data in supplemental database 108. In embodiments, the transport computer 110 may obtain the session identifier from the resource provider that was involved with the authentication described above with reference to operations 1a, 1b, or 1c, 2, and 3.

At operation 4 of FIG. 1, the transport computer 110 may generate and transmit an authorization request message and the received or obtained session identifier to the processor computer 112. In embodiments, the authorization request message may be generated by a resource provider associated with a user conducting a transaction or requesting access to a location or data.

In accordance with at least one embodiment, at operation 5 the processor computer 112 may retrieve all or a portion of the data associated with the received session identifier from the supplemental database 108. In embodiments, an authorizing entity (authorizing computer 114) may specify one or more preferences for which type and how much data associated with interactions or transactions conducted by a user are appropriate for determining whether to authorize or decline a transaction. The processor computer 112 may identify which policies or preferences apply to which authorizing computer 114 and select or request a portion of the data stored in the supplemental database 108 that is associated with a session identifier.

In FIG. 1 at operation 6, the processor computer 112 transmits the portion of data stored in the supplemental database 108 based on the session identifier as well as information from the current transaction (e.g., data included in the authorization request message at operation 4 from the transport computer 110) to the analytics engine 116. In accordance with at least one embodiment, the analytics engine 116 is configured to generate a value which represents a likelihood of a fraudulent transaction for the authorization request message using the data from the supplemental database 108 and the information included in the authorization request message. In embodiments, the analytics engine 116 may be configured to utilize one or more authorization risk models for generating the value.

At operation 7, the processor computer 112 may modify the authorization request message to include the data retrieved from the supplemental database 108 as well as the value generated by the analytics engine 116 and, transmit the modified authorization request message to the authorizing computer 114. The authorization request message may be modified by setting a value which represents what type of data was retrieved as well as the value generated by the analytics engine 116. In some embodiments, a flag or tag may be set or associated with the authorization request message that represents the retrieval of the data from the supplemental database 108 and the analysis performed by the analytics engine 116.

At operation 8, the authorization computer 114 utilizes the modified authorization request to authorize or decline the transaction associated with the authorization request. The authorization computer 114 generates an authorization response message at operation 8 which indicates the approve or decline of the transaction and transmits the authorization response message to the processor computer 112. In embodiments, at operation 9, the processor computer 112 transmits the authorization response message to the transport computer 110 as well as the data retrieved from the supplemental database 108 using the session identifier. In accordance with at least one embodiment, the processor computer 112 may transmit the data used in authorizing or declining the transaction (data from supplemental database 108) to a resource provider computer (e.g., via the transport computer 110) for use in further analysis or reporting by the resource provider computer.

At the end of the day or at any other suitable period of time, a clearing and settlement process may occur between the processor computer 112, the authorizing computer 114, and the transport computer 110.

Figure 2:
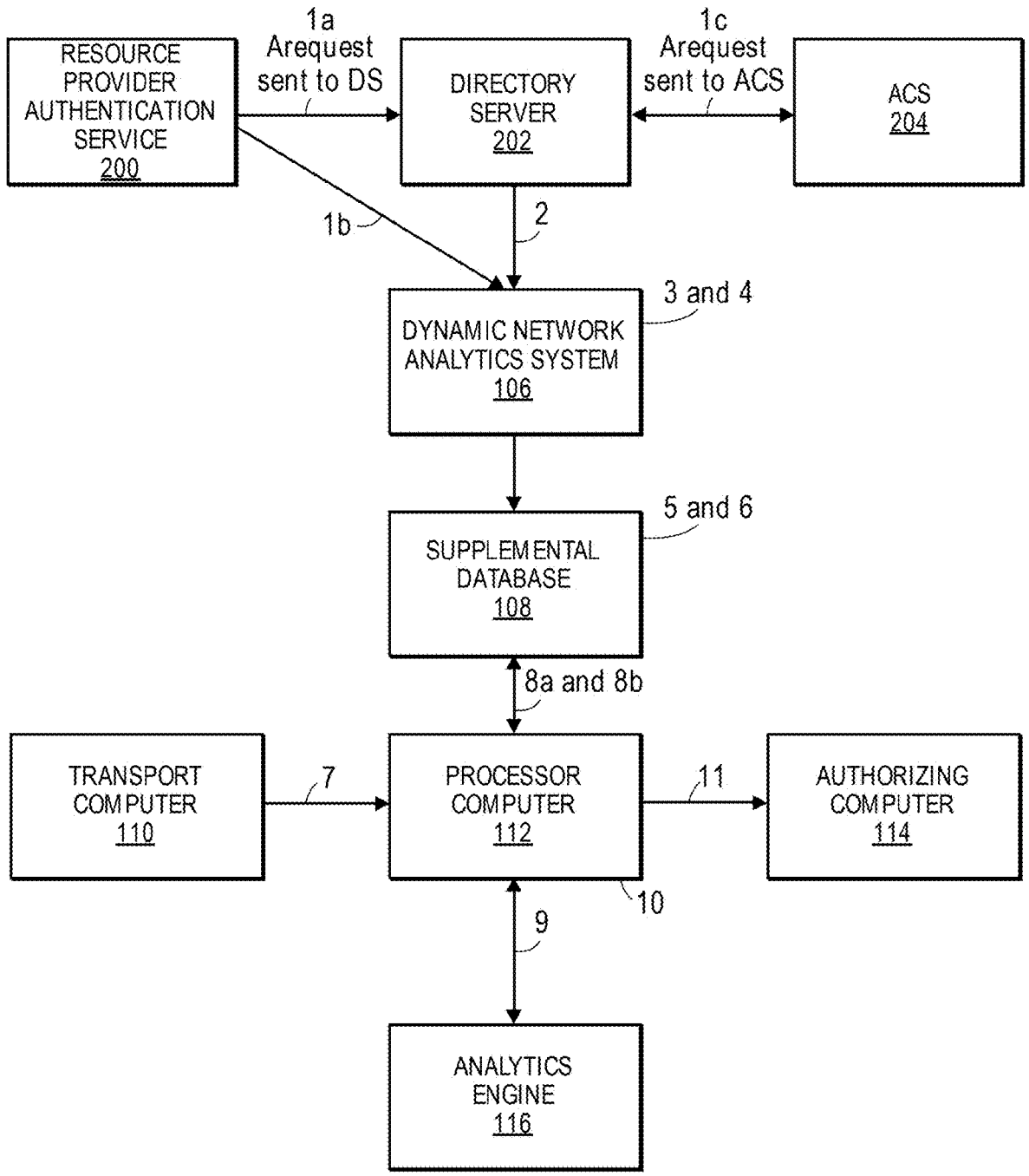
FIG. 2 depicts a number of components that may be involved in a system used to implement at least some embodiments of the disclosure.

FIG. 2 depicts a number of components that may be involved in a system used to implement at least some embodiments of the disclosure. FIG. 2 includes resource provider authentication service 200, directory server (DS) 202, access control server (ACS) 204, dynamic network analytics system 106, supplemental database 108, transport computer 110, processor computer 112, authorizing computer 114, and analytics engine 116. It should be understood that for simplicity of illustration, a certain number of components are shown in FIG. 1. However, some embodiments may include more than one of each component, and some embodiments may include fewer than or greater than components specifically shown in FIG. 1. The components of FIG. 2 illustrate an embodiment that includes one or more different entities for authenticating interactions by users with a resource provider and populating the supplemental database 108 with data about the interactions and a score or value that represents an authentication risk analysis performed by the dynamic network analytics system 106 and/or ACS 204 and associated with a session identifier.

At operation 1a of FIG. 2 a resource provider authentication service 200 may generate and transmit an authentication request message (e.g., a request sent to DS) that is associated with a transaction to directory server 202. The transaction may be conducted between a user and a resource provider computer (not shown). The authentication request message at 1a may include information about the user (personal information), device data, transaction information, IP address information, etc., associated with the transaction. For example, a user may be attempting to authenticate themselves to gain access to a restricted area or to restricted data.

At operation 1b of FIG. 2 the resource provider authentication service 200 may transmit the data included in the authentication request message to the dynamic network analytics system 106. The resource provider authentication service 200 may generate a session ID by communicating with the dynamic network analytics system 106 with which to associate the data or payload included in the authentication request message. At operation 1c, the directory server 202 may transmit the authentication request message to the access control server 204 (Arequest sent to ACS).

In embodiments, the ACS 204 may be configured to utilize the data included in the authentication request message to authenticate a user attempting to conduct a transaction access data, or perform some other interaction.

At operation 2 of FIG. 2, the directory server 202 receives and transmits the result of the authentication request message (an authentication response message) to the dynamic network analytics system 106 and optionally the resource provider authentication service 200. The dynamic network analytics system 106 may be configured to store a result of the authentication analysis performed by the ACS 204 with the session identifier for the data included in the authentication request message.

In accordance with at least one embodiment, at operation 3 the dynamic network analytics system 106 may be configured to generate an authentication risk analysis score or value using the data associated with the authentication request message and the result or other analysis performed by the ACS 204. In embodiments, the dynamic network analytics system 106 associates the authentication risk analysis score with the data for the transaction or authentication request message using the session identifier.

The dynamic network analytics system 106 is configured to transmit and store, at operation 4, the data included in the authentication request message, the analysis performed by the ACS 204, and the authentication risk analysis score in the supplemental database 108 and associate the above attributes or metrics with the session identifier for later retrieval by the processor computer 112 when processing an authorization request message.

In accordance with at least one embodiment, the dynamic network analytics system 106 may be configured to not store the data included in the authentication request message in the supplemental database 108 in response to the ACS not authenticating the authentication request message at operation 5. At operation 6, the dynamic network analytics system 106 may store the data and the authentication risk analysis score in the supplemental database 108 with an indicator that identifies that the ACS 204 did authenticate the transaction. In embodiments, different indicators or flags may be associated with the data and session identifier stored in the supplemental database 108 for determining whether the data should be transmitted to the processor computer 112 for processing certain types of authorization request messages. For example, a certain policy or preference from an authorizing computer 114 may indicate that data should be retrieved from the supplemental database 108 by the processor computer 112 only in transactions where the ACS 204 authenticated the transaction. Another authorizing computer 114 may indicate that data should be retrieved from the supplemental database 108 by the processor computer 112 only in transactions where a PAN and CAVV were provided in the authentication request message from the resource provider authentication service 200.

At operation 7, the transport computer 110 may generate and transmit an authorization request message and the received or obtained session identifier to the processor computer 112. In embodiments, the transport computer 110 may receive or request the session identifier from the resource provider authentication service 200 or the dynamic network analytics system 106. In embodiments, the authorization request message may be generated by a resource provider associated with a user conducting a transaction or requesting access to a location or data. For example, the resource provider could be associated with the user that is conducting the authentication request via the resource provider authentication service 200. In some embodiments, the resource provider and transport computer 110 are in communication with the resource provider authentication service 200 and request the authentication request as part of a transaction process.

In accordance with at least one embodiment, at operations 8a and 8b the processor computer 112 may retrieve all or a portion of the data associated with the received session identifier from the supplemental database 108. As described herein, the processor computer 112 may implement or utilize various rules or policies to determine whether and what portion of data to retrieve from the supplemental database 108. For example, the processor computer 112 may retrieve the data from the supplemental database 108 if the session identifier is included in the authorization request message or may only request the data from the supplemental database 108 if a CAVV is included in the authorization request message.

In embodiments, an authorizing entity (authorizing computer 114) may specify one or more preferences for which type and how much data associated with interactions or transactions conducted by a user are appropriate for determining whether to authorize or decline a transaction. The processor computer 112 may identify which policies or preferences apply to which authorizing computer 114 and select or request a portion of the data stored in the supplemental database 108 that is associated with a session identifier.

At operation 9 the processor computer 112 transmits the portion of data stored in the supplemental database 108 based on the session identifier as well as information from the current transaction (e.g., data included in the authorization request message at operation 7 from the transport computer 110) to the analytics engine 116. In accordance with at least one embodiment, the analytics engine 116 is configured to generate a value which represents a likelihood of a fraudulent transaction for the authorization request message using the data from the supplemental database 108 and the information included in the authorization request message. In embodiments, the analytics engine 116 may be configured to utilize one or more authorization risk models for generating the value.

At operation 10, the processor computer 112 may modify the authorization request message to include the data retrieved from the supplemental database 108 as well as the value generated by the analytics engine 116 and, transmit the modified authorization request message to the authorizing computer 114. The authorization request message may be modified by setting a value which represents what type of data was retrieved as well as the value generated by the analytics engine 116. In some embodiments, a flag or tag may be set or associated with the authorization request message that represents the retrieval of the data from the supplemental database 108 and the analysis performed by the analytics engine 116.

At operation 11, the authorization computer 114 utilizes the modified authorization request to authorize or decline the transaction associated with the authorization request. The authorization computer 114 generates an authorization response message which indicates the approve or decline of the transaction and transmits the authorization response message to the processor computer 112 which then transmits the authorization response message to the transport computer 110 as seen in FIG. 1 at operations 8 and 9. In accordance with at least one embodiment, the processor computer 112 may communicate with the analytics engine 116 and/or the supplemental database 108 to store a result of the authorization request message/authorization response message processed by the authorizing computer 114.

At the end of the day or at any other suitable period of time, a clearing and settlement process may occur between the processor computer 112, the authorizing computer 114, and the transport computer 110.

Figure 3:
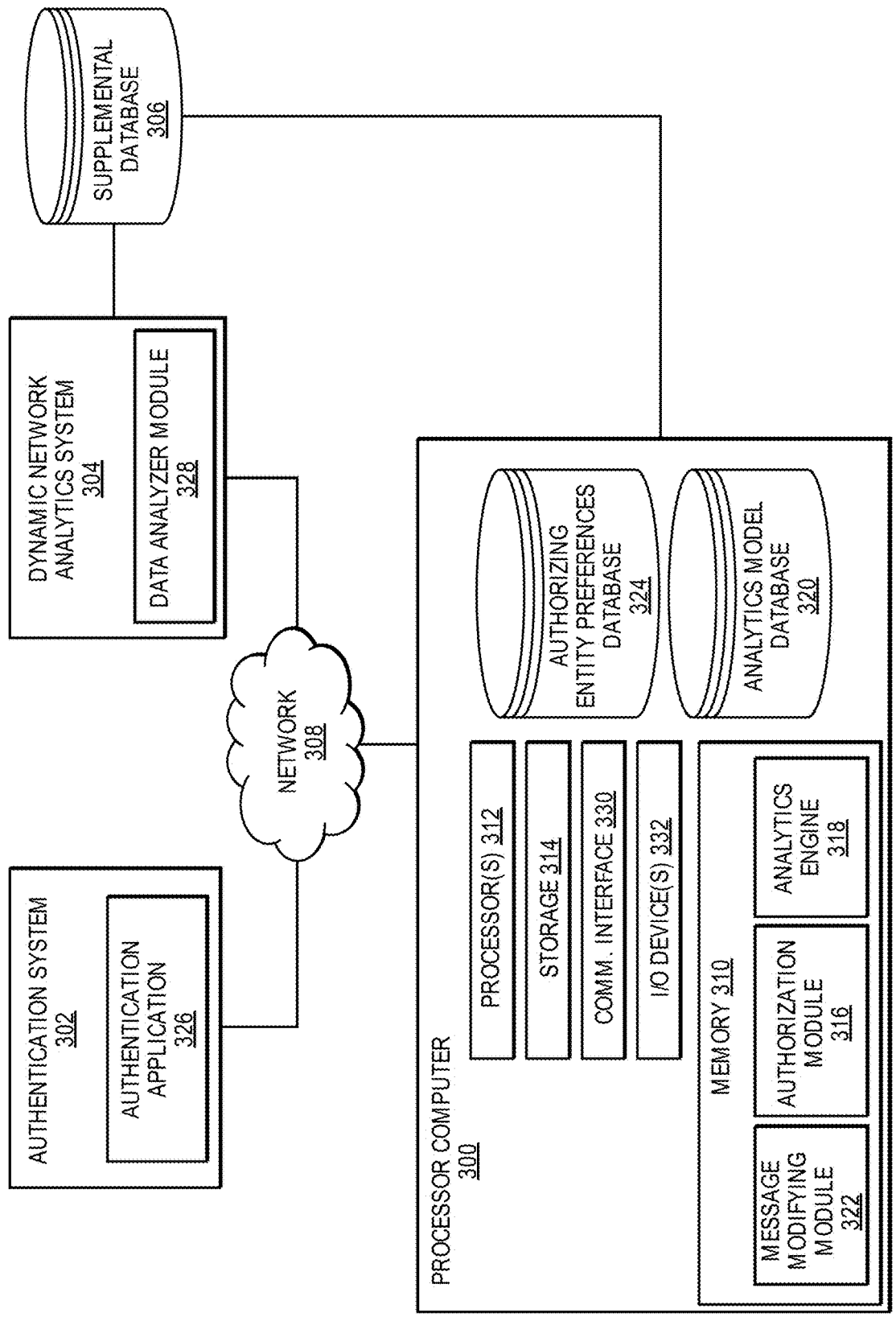
FIG. 3 depicts an example system architecture that may be implemented to provide a modified authorization request feature in accordance with embodiments of the disclosure.

FIG. 3 depicts an example system architecture that may be implemented to provide a modified authorization request feature in accordance with embodiments of the disclosure. In embodiments, a processor computer 300 may be in communication with one or more authentication systems 302, a dynamic network analytics system 304, and a supplemental database 306 via a network connection 308. The network connection 308 may include at least a transaction processing network. In some embodiments, the processor computer 300 may be an example of processor computer 112 of FIGS. 1 and 2.

In embodiments, the processor computer 300 may include at least one memory 310 and one or more processing units (or processor(s)) 312. The processor(s) 312 may be implemented as appropriate in hardware, computer-executable instructions, firmware, or combinations thereof. Computer-executable instruction of firmware embodiments of the processor(s) 312 may include computer-executable or machine executable instructions written in any suitable programming language to perform the various functions described.

The memory 310 may store program instructions that are loadable and executable on the processor(s) 312, as well as data generated during the execution of these programs. Depending on the configuration and type of processor computer 300, the memory 310 may be volatile (such as random access memory (RAM)) and/or non-volatile (such as read-only memory (ROM), flash memory, etc.). The processor computer 300 may also include additional storage 314, such as either removable storage or non-removable storage including, but not limited to, magnetic storage, optical disks, and/or tape storage. The disk drives and their associated computer-readable media may provide non-volatile storage of computer-readable instructions, data structures, program modules, and other data from the processor computer 300. In some embodiments, the memory 310 may include multiple different types of memory, such as static random access memory (SRAM), dynamic random access memory (DRAM) or ROM.

Turning to the contents of memory 310 in more detail, the memory 310 may include an operating system and one or more application programs or services for implementing the features disclosed herein including at least a module for performing authorization of a transaction (authorization module 316) using data from the supplemental database 306, a module for analyzing the data (analytics engine 318) from the supplemental database 306 and one or more analytics models from analytics model database 320 to generate a value or score that represents the likelihood of a fraudulent transaction, as well as a module for modifying an authorization request message (message modifying module 322) to include the data retrieved from the supplemental database 306 as well as any value or score generated by the analytics engine 318. In embodiments, the scores or values as well as models utilized to generated the scores or values may be stored or access by the analytics engine 318 from the analytics model database 320. In accordance with at least one embodiment, preferences, rules, or polices specified by authorizing computers may be stored in the authorizing entity preferences database 324 for use by the processor computer in requesting a portion of data stored in the supplemental database 306 for processing an authorization request from a transport computer (not pictured).

In some embodiments, the authorization module 316, analytics engine 318, and message modifying module 322 may, in conjunction with the processor 312, be configured to receive an authorization request message and a session identifier to modify the authorization request message and provide additional data for use by an authorizing entity, such as an authorization computer, for authorizing or declining a transaction. In embodiments, the processor computer 300 and authorization module 316 may retrieve a portion of data stored in the supplemental database 306 using the received session identifier and one or more rules, preferences, or policies in the authorizing entity preferences database 324. In embodiments, the processor computer 300 and the analytics engine 318 may generate a value or score that represents a likelihood of a fraudulent transaction for the transaction associated with the authorization request message using one or more risk analysis models stored in the analytics model database 320. In embodiments, the message modifying module 322 and the processor computer 300 may be configured to modify the authorization request message to include the retrieved data from the supplemental database 306 as well as any score or value generated by the analytics engine 318. In accordance with at least one embodiment, the score or value generated by the analytics engine 318 may be stored and associated with a user or user device based on the session identifier received with the authorization request message.

In embodiments, the session identifier may be generated for an authentication request message on behalf of a resource provider operating a resource provider computer and/or a transport computer for a user interacting or otherwise attempting to conduct a transaction that is processed by an authentication system 302. The authentication system 302 may include an authentication application 326 that is configured to communicate with the dynamic network analytics system 304 via network connection 308 to generate a session identifier for an authentication request message. In accordance with at least one embodiment, the dynamic network analytics system 304 may include a data analyzer module 328 that is configured to generate an authentication risk analysis score, receive an authentication response message from an access control server, authenticate a user associated with a transaction using the data included in the authentication request message, and store the data of the authentication request message, the authentication risk analysis score, and a result from an access control server in the supplemental database 306. The authentication risk analysis score, the result from an access control server (if available), and the data included in the authentication request message are associated with a session identifier in the supplemental database 306 which is used by the processor computer 300 to retrieve or obtain a portion of the data stored in the supplemental database 306 for one or more interactions or transactions by a user or user device with the authentication system 302.

The processor computer 300 may also contain communication interface(s) 330 that enable the processor computer 300 to communicate with a stored database, another computing device or server, one or more remote devices, other application servers, and/or any other suitable electronic devices. In some embodiments, the communication interface 330 may enable the processor computer 300 to communicate with other electronic devices on a network (e.g., on a private network). The processor computer 300 may also include input/output (I/O) device(s) and/or ports 332, such as for enabling connection with a keyboard, a mouse, a pen, a voice input device, a touch input device, a display, speakers, a printer, etc. The authentication system 302 may be an example of authentication system A 100, authentication system B 102, external data source 104, or resource provider authentication service 200 from FIGS. 1 and 2. Dynamic network analytics system 304 may be an example of dynamic network analytics system 106 of FIGS. 1 and 2.

Figure 4:
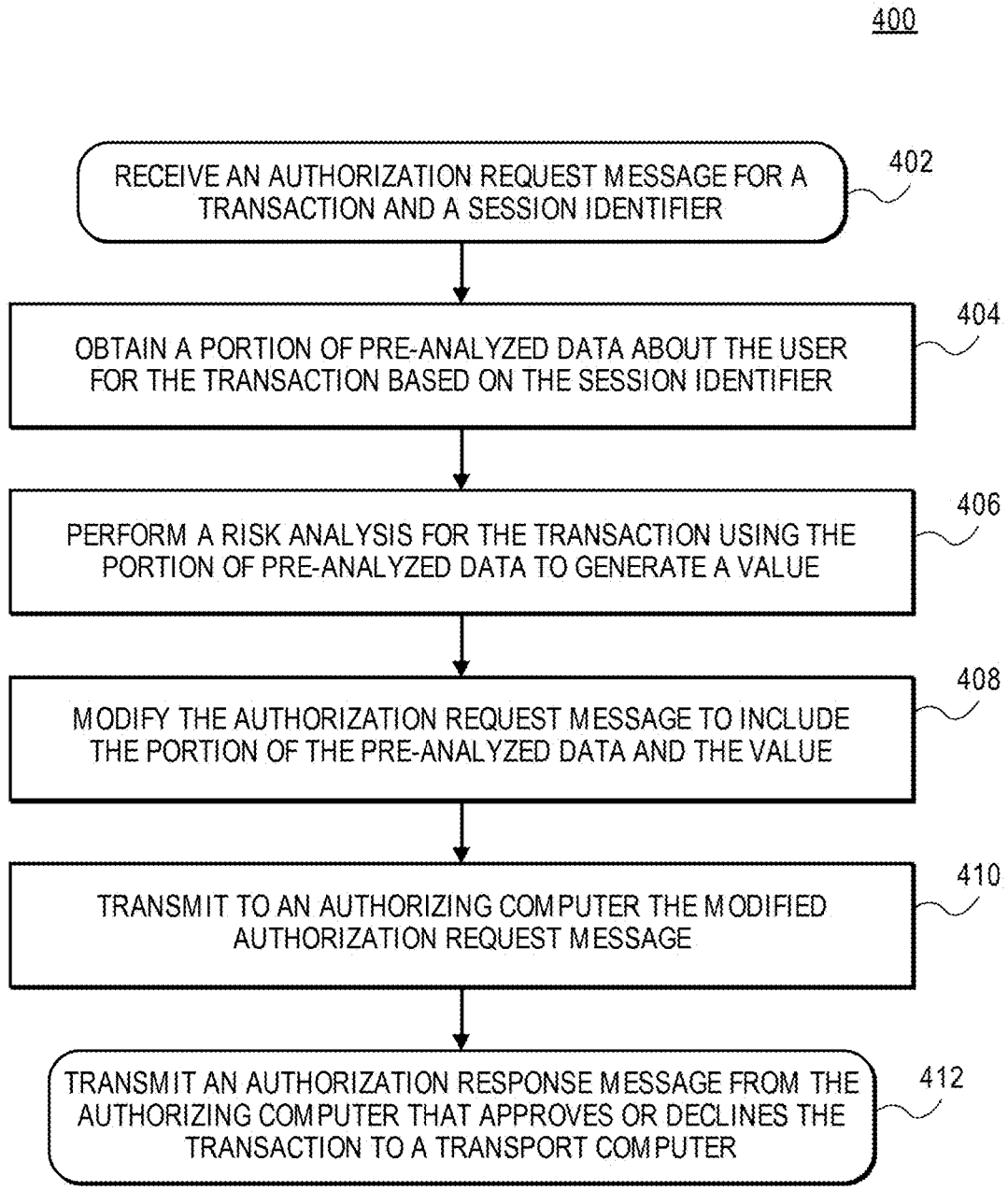
FIG. 4 depicts a flow diagram of a process for performing a modified authorization request feature in accordance with at least some embodiments.

FIG. 4 depicts a flow diagram of a process for performing a modified authorization request feature in accordance with at least some embodiments. FIG. 4 illustrates process 400 which can be performed by a processor computer depicted in FIGS. 1-3.

Process 400 may begin at 402 by receiving an authorization request message for a transaction and a session identifier. As described herein, the session identifier may be generated by an authentication request system and/or a dynamic network analytics system in response to receiving or processing an authentication request message on behalf of a resource provider and/or transport computer. Process 400 may include, at 404, obtaining a portion of pre-analyzed data about the user for the transaction based on the session identifier. In embodiments, the processor computer may request or otherwise obtain a portion, including all, of data points or attributes associated with a session identifier and stored in a supplemental database. Process 400 may include, at 406, performing a risk analysis for the transaction using the portion of pre-analyzed data to generate a value. In embodiments, the processor computer may interact or otherwise communicate with an analytics engine to generate the value which represents a likelihood that the transaction associated with the authorization request is a fraudulent transaction using the portion of pre-analyzed data associated with the session identifier. An authorizing entity such as an authorizing computer that may subsequently authorize or decline the transaction may specify preferences or rules which indicate specific data or attributes included in the supplemental database and associated with a session identifier for retrieval and analysis by the processor computer and analytics engine.

Process 400 may include modifying the authorization request message to include the portion of pre-analyzed data and the value at 408. In embodiments, the processor computer may modify or set one or more values included in the authorization request message to represent inclusion of certain attributes and analysis of said attributes that are associated with a session identifier and obtained from the supplemental database. The process 400 may include transmitting to an authorizing computer the modified authorization request message at 410. In accordance with at least one embodiment, the process 400 may conclude at 412 by transmitting an authorization response message from the authorizing computer that approves or declines the transaction to a transport computer. In embodiments, the process computer may store a result of the authorization request message from the authorizing computer (e.g., the authorization response message) in the supplemental database and associate the result with the session identifier.

Figure 5:
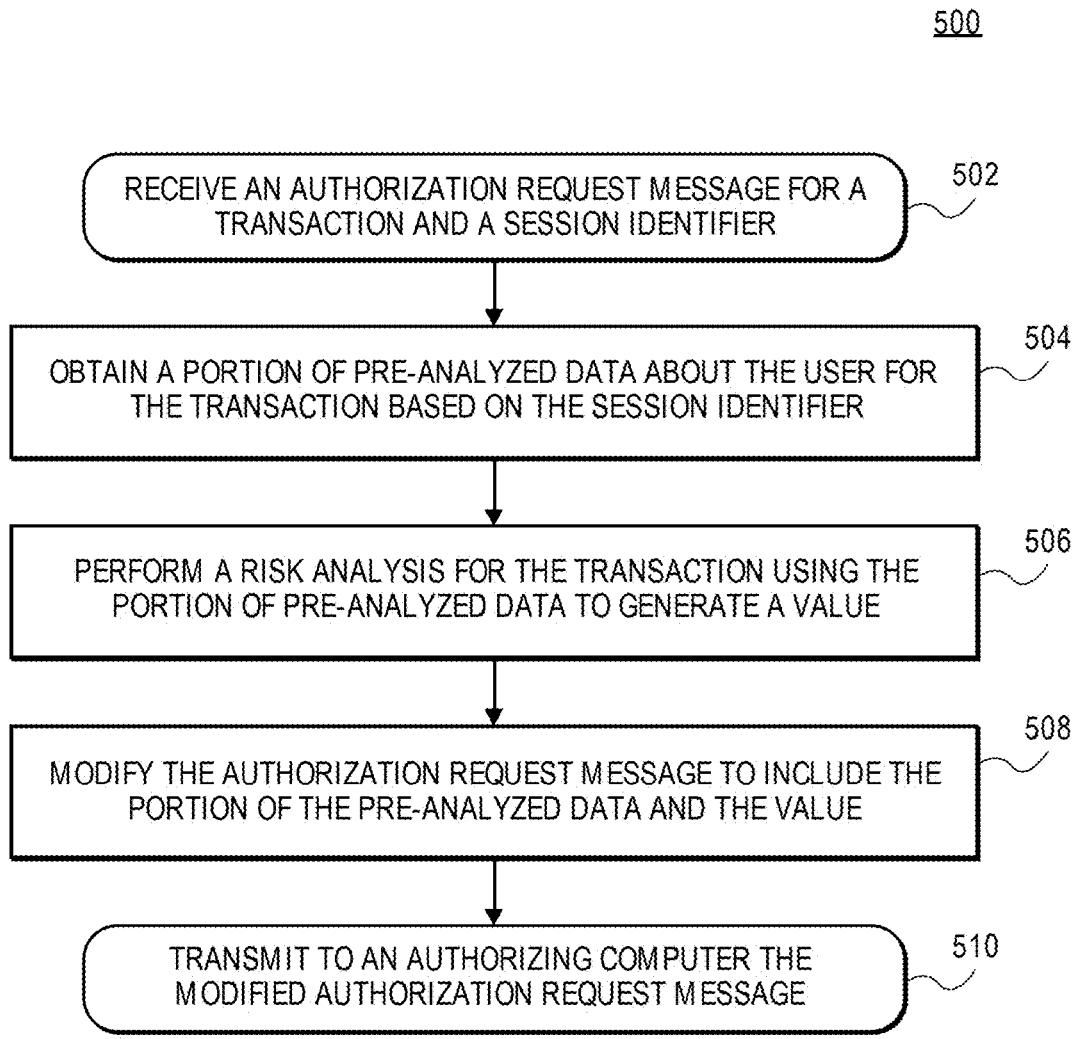
FIG. 5 depicts a flow diagram of a process for performing a modified authorization request feature in accordance with at least some embodiments.

FIG. 5 depicts a flow diagram of a process for performing a modified authorization request feature in accordance with at least some embodiments. FIG. 5 illustrates process 500 which can be performed by a processor computer depicted in FIGS. 1-3.

Process 500 may begin at 502 by receiving an authorization request message for a transaction and a session identifier. In embodiments, the authorization request message may be received from a transport computer or a resource provider computer. The process 500 may include obtaining a portion of pre-analyzed data about the user for the transaction based on the session identifier at 504. In accordance with at least one embodiment, a number of attributes, metrics, or data may be stored in the supplemental database and associated with a session identifier which correspond to one or more interactions by a user or user device with a resource provider, transport computer, and/or authentication system. The process 500 may include performing a risk analysis for the transaction using the portion of pre-analyzed data to generate a value at 506. The process 500 may include modifying the authorization request message to include the portion of the pre-analyzed data and the value at 508. The process 500 may conclude at 510 by transmitting to an authorizing computer the modified authorization request message for approving or declining a transaction associated with the authorization request message. In accordance with at least one embodiment, the authorizing computer may not perform an analysis and authorization of the transaction but instead rely on the processor computer and generated value to determine whether to approve or decline the transaction associated with the authorization request message.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A computer-implemented method comprising:
   receiving, by a processing computer, an authorization request message for a transaction and a session identifier that corresponds to a user and is associated with data for one or more previous interactions by the user associated with the transaction in a database;
   obtaining, by the processing computer from the database based at least in part on the session identifier, a portion of pre-analyzed data, the pre-analyzed data including data about the user and the one or more previous interactions, wherein the data about the user and the one or more previous interactions is pre-analyzed and stored in the database in association with the session identifier;
   performing, by the processing computer, a risk analysis for the transaction using the portion of the pre-analyzed data to generate a value indicating whether the transaction is a fraudulent transaction;
   modifying, by the processing computer, the authorization request message to include the portion of the pre-analyzed data and the value; and
   transmitting, by the processing computer to an authorizing computer, the modified authorization request message,
   wherein, receiving by the authorizing computer the modified authorization request message, causes the authorizing computer to generate an authorization response message, the authorizing computer generating the authorization response message based on the modified authorization request message, the authorization response message approving or declining the transaction, and
   wherein the portion of the pre-analyzed data includes specific data points that are specified for retrieval by the authorizing computer.

2. The computer-implemented method of claim 1, further comprising transmitting, by the processing computer to a resource provider computer, the portion of pre-analyzed data and the value.

3. The computer-implemented method of claim 1, wherein
   modifying the authorization request message to include the portion of pre-analyzed data and the value includes modifying a data field in the authorization request message.

4. The computer-implemented method of claim 1, further comprising updating the database with updated interactions by the user by utilizing an application programming interface (API) call by a resource provider computer to the database.

5. The computer-implemented method of claim 1, wherein the session identifier includes at least a key or a unique user identifier.

6. The computer-implemented method of claim 1, wherein generating the authorization response message by the authorizing computer includes the authorizing computer not performing an analysis of the transaction based at least in part on the modified authorization request message.

7. The computer-implemented method of claim 1, wherein the session identifier provided in the authorization request message matches the session identifier stored in the database.

8. The computer-implemented method of claim 1, wherein the modifying comprises:
   setting, in the authorization request message, an indicator indicating a type of data obtained from the database.

9. A server comprising:
   a processor; and
   a computer readable medium coupled to the processor, the computer readable medium comprising code, executable by the processor, to implement a method including:
   receiving an authorization request message for a transaction and a session identifier that corresponds to a user and is associated with data for one or more previous interactions by the user associated with the transaction in a database;
   obtaining, from the database based at least in part on the session identifier, a portion of pre-analyzed data, the pre-analyzed data including data about the user and the one or more previous interactions, wherein the data about the user and the one or more previous interactions is pre-analyzed and stored in the database in association with the session identifier;
   performing a risk analysis for the transaction using the portion of the pre-analyzed data to generate a value indicating whether the transaction is a fraudulent transaction;
   modifying the authorization request message to include the portion of the pre-analyzed data and the value; and
   transmitting, to an authorizing computer, the modified authorization request message,
   wherein, receiving by the authorizing computer the modified authorization request message, causes the authorizing computer to generate an authorization response message, the authorizing computer generating the authorization response message based on the modified authorization request message, the authorization response message approving or declining the transaction, and wherein the portion of the pre-analyzed data includes specific data points that are specified for retrieval by the authorizing computer.

10. The server of claim 9, wherein the pre-analyzed data is analyzed by one or more authentication risk models associated with a plurality of authentication requesters.

11. The server of claim 9, wherein the pre-analyzed data includes one or more of a device identifier associated with the transaction, transaction detail information, personal information for the user, internet protocol (IP) address information, web site traffic, or web site interaction information.

12. The server of claim 9, wherein modifying the authorization request message includes setting one or more flags associated with the authorization request message for the transaction.

13. The server of claim 9, wherein the method further includes transmitting, to a transport computer, the portion of pre-analyzed data and the value.

14. A processor computer comprising:
a processor; and
a computer readable medium coupled to the processor, the computer readable medium comprising code, executable by the processor, to implement a method including:
receiving an authorization request message for a transaction and a session identifier that corresponds to a user and is associated with data for one or more previous interactions by the user associated with the transaction in a database;
obtaining, from the database based at least in part on the session identifier, a portion of pre-analyzed data, the pre-analyzed data including data about the user and the one or more previous interactions, wherein the data about the user and the one or more previous interactions is pre-analyzed and stored in the database in association with the session identifier;
performing a risk analysis for the transaction using the portion of the pre-analyzed data to generate a value indicating whether the transaction is a fraudulent transaction;
modifying the authorization request message to include the portion of the pre-analyzed data and the value; and
transmitting, to an authorizing computer, the modified authorization request message,
wherein, receiving by the authorizing computer the modified authorization request message, causes the authorizing computer to generate an authorization response message, the authorizing computer generating the authorization response message based on the modified authorization request message, the authorization response message approving or declining the transaction, and
wherein the portion of the pre-analyzed data includes specific data points that are specified for retrieval by the authorizing computer.

15. The processor computer of claim 14, wherein the method further includes transmitting, to a resource provider associated with a transport computer, the portion of pre-analyzed data and the value.

16. The processor computer of claim 14, wherein modifying the authorization request message to include the portion of pre-analyzed data and the value includes modifying a data field in the authorization request message.

17. The processor computer of claim 14, wherein the method further includes generating, by the authorizing computer, the authorization response message by performing an additional analysis of the transaction based at least in part on the modified authorization request message.

* * * * *